United States Patent [19]

Geigel et al.

[11] 4,029,912

[45] June 14, 1977

[54] COMMON CONTROL DIGITAL ECHO SUPPRESSOR

[75] Inventors: Alfred Antonio Geigel, Dunellen; Robert Ernest LaMarche, Atlantic Highlands, both of N.J.

[73] Assignee: Bell Telephone Laboratories, Incorporated, Murray Hill, N.J.

[22] Filed: Dec. 10, 1975

[21] Appl. No.: 639,348

[52] U.S. Cl. .......................... 179/170.2; 179/170.6
[51] Int. Cl.² ........................................ H04B 3/20
[58] Field of Search .......... 179/170.2, 170.6, 170.8

[56] References Cited

UNITED STATES PATENTS

| | | | |
|---|---|---|---|
| 3,562,448 | 2/1971 | May ................. | 179/170.6 |
| 3,673,355 | 6/1972 | LaMarche et al. ............. | 179/170.6 |
| 3,706,091 | 12/1972 | May ................... | 340/347 |
| 3,823,275 | 7/1974 | LaMarche et al. ............. | 179/170.2 |
| 3,896,273 | 7/1975 | Fariello ........................ | 179/170.6 |

Primary Examiner—Kathleen H. Claffy
Assistant Examiner—Randall P. Myers
Attorney, Agent, or Firm—D. E. Snedeker

[57] ABSTRACT

A common control digital echo suppressor is disclosed which is configurable as full or split selectively on a channel-by-channel basis. Improved break-in and reduced hangover are provided by an arrangement for approximating the anticipated echo signals more accurately and by a wait-window technique to better distinguish between impulse noise and speech for break-in. The echo signal arrangement accurately approximates anticipated echo during both the rising and falling portions of speech signals. The wait-window technique provides for substantially instantaneous break-in, then a short wait period for impulse noise to subside, followed by a speech sampling window. If outgoing signals are detected during the window, suppression removal goes into a full break-in state. Otherwise, suppression is reinserted at the end of the window.

19 Claims, 8 Drawing Figures

TRANSMIT PATH STATES

RECEIVE PATH STATES

COMMON CONTROL DIGITAL ECHO SUPPRESSOR

BACKGROUND OF THE INVENTION

The invention relates to digital echo suppressors for two-way transmission systems, and more particularly to common control digital echo suppressors.

Echos are produced in a transmission system whenever an impedance discontinuity or mismatch exists, such as at the junction between a four-wire transmission channel and a two-wire transmission channel. The annoying effects of echos can be reduced by the use of echo suppressor apparatus which essentially operates to disable the echo return path of a subscriber when he is transmitting. Thus, basically an echo suppressor is a voice-operated switching device which may be situated near one end of a four-wire transmission channel. If echos in both directions are to be suppressed by the device, it is commonly referred to as a full echo suppressor; if echos are suppressed in only one direction, the device is referred to as a split echo suppressor.

In a split echo suppressor, for example, the echo suppressor apparatus nearest a particular subscriber end typically functions to disable the transmit, or outgoing, path from that subscriber when signals from the far-end subscriber appear on the receive, or incoming, path. Thus, echos due to incoming signals on the receive path are prevented from returning to the far-end subscriber over the transmit path. Echo suppressor apparatus at the far subscriber end functions in a similar manner to prevent echos from returning to the near-end subscriber when the near-end subscriber is transmitting. A full echo suppressor essentially combines a pair of split echo suppressors in a single facility located at the near subscriber end, the two split echo suppressors sharing certain of the suppression control circuitry.

During echo suppression in a system utilizing either a full or a split echo suppressor, suppression must be removed from the transmit path when the near-end subscriber breaks in, a condition commonly referred to as double talking since both subscribers are talking at the same time. For this purpose, the echo suppressor includes break-in circuitry for distinguishing between speech signals generated on the transmit path by the near-end subscriber and echo signals on the transmit path due to far-end subscriber speech signals on the receive path. This may be accomplished, for example, by sampling the signals on the transmit and receive paths and comparing the samples, or representations thereof, to determine their relative magnitudes. If the transmit path signals exceed the receive path signals, it is assumed that the near-end subscriber is transmitting and break-in is effected by removing echo suppression from the transmit path. On the other hand, if the transmit path signals do not exceed the receive path signals, it is assumed that the near-end subscriber is not transmitting and the transmit path remains disabled. Similarly, in the case of a full echo suppressor, the break-in circuitry functions to remove suppression from the near-end receive path when the far-end subscriber breaks in.

While the above approach has been generally effective in suppressing echos, it often results in an undesirable amount of clipping of a subscriber's speech signals, particularly if he speaks softly. Consequently, arrangements have been proposed for approximating the echo that may appear on one path due to signals on the other path. The echo signal approximations may then be compared with the actual signals appearing on the one path to determine whether the signals contain speech to be transmitted on the one path. The speed and accuracy with which break-in can be effected without excessive clipping of a subscriber's speech signals, therefore, depends upon the accuracy with which the echo signal approximations are generated.

Further undesirable clipping of a subscriber's speech signals may occur if break-in and suppression are effected substantially instantaneously based upon the comparison of the transmit and receive path signals. It is known to alleviate the problem somewhat by providing a break-in hangover interval such that suppression is not reinserted in the receive path of a subscriber until a predetermined interval of time after the other subscriber stops transmitting. However, prior arrangements have generally required hangover intervals of such length, typically on the order of several hundred milliseconds, so as to permit an undesirable amount of echo to get through. Arrangements providing a suppression hangover interval so as to delay break-in and thus suppression removal until a predetermined interval of time after double talking is detected, on the other hand, may reduce echo but tend to produce unwanted speech clipping.

SUMMARY OF THE INVENTION

It is therefore a general object of the present invention to provide an improved echo suppressor, particularly an improved digital echo suppressor.

A more specific object is to improve the break-in performance of digital echo suppressors.

In a specific illustrative embodiment of a digital echo suppressor in accordance with applicants' invention, split or full echo suppression can be provided selectively on a channel-by-channel basis with improved break-in and reduced hangover. A pair of detector circuits and a pair of suppression circuits are adapted for connection in circuit with the incoming and outgoing paths of the individual transmission channels on a time division multiplexed basis so as to provide full echo suppressor operation. The functions of the detector and suppression circuits associated with one path can be disabled automatically, if desired, so as to provide split echo suppression for selected transmission channels while providing full echo suppression for other transmission channels.

The echo signals that may appear on one transmission path due to speech signals on the other path are digitally approximated by following increasing magnitude speech signals and, during decreasing magnitude speech signals, following decreasing signal peaks separated approximately by a predetermined interval of time reflecting the anticipated echo end delay for the particular transmission facility. The echo signal approximations are also attenuated in magnitude to reflect the anticipated echo signal return loss for the facility. Comparision of the thus generated echo signal approximations with the actual signals appearing on the one path permits speech detection, and thus break-in, with greater speed and accuracy than prior break-in arrangements. The improved break-in characteristics, in turn, permit the usual break-in hangover time to be reduced substantially, thereby reducing the amount of echo returned after double talking has ceased.

As with prior echo suppressor arrangements, impulse noise may be detected as speech and cause unwanted break-in. However, in accordance with one aspect of the illustrative embodiment of the invention, a wait-window technique is employed during break-in to significantly reduce the unwanted break-in time by distinguishing more quickly between noise and speech. Specifically, immediately following break-in a short wait period is provided of sufficient duration to allow anticipated impulse noise to subside, in turn followed by a short speech sampling window during which the presence or absence of speech signals is determined in the normal manner. The absence of speech signals during the sampling window indicates that break-in was likely caused by noise and break-in is terminated immediately. Only in the event speech signals are present during the sampling window is the break-in state continued into the break-in hangover time upon cessation of double talking. Advantageously, therefore, unwanted break-in due to noise is reduced to the duration of the short wait-window periods.

BRIEF DESCRIPTION OF THE DRAWING

The above and other objects, features and advantages of the invention may be fully apprehended from the following detailed description and the accompanying drawing in which:

FIG. 2 is arranged above FIG. 3, show portions of the illustrative echo suppressor of FIG. 1 in greater detail;

GENERAL DESCRIPTION

Figure 1:
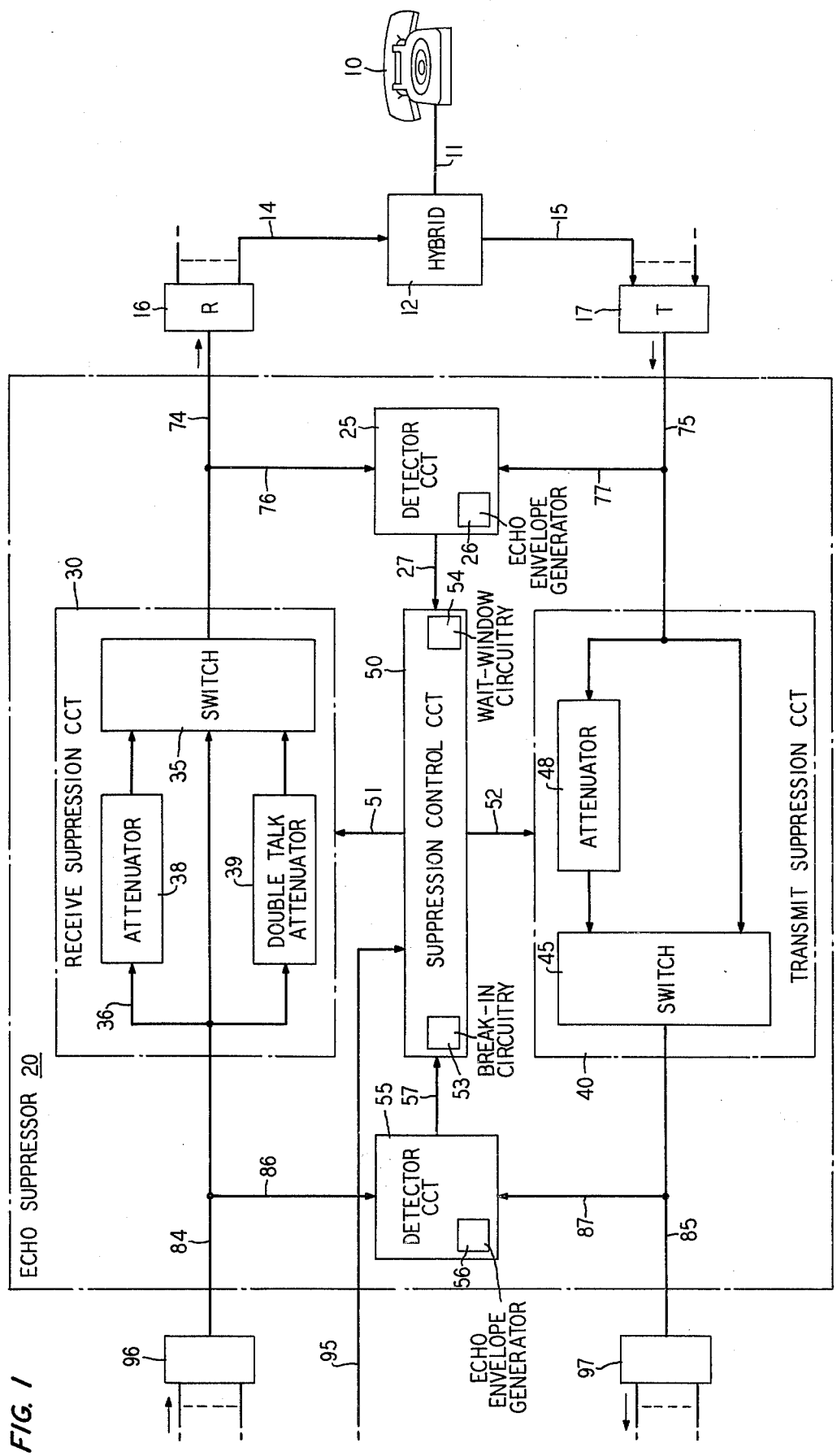
FIG. 1 is a functional block diagram of an illustrative transmission system employing an echo suppressor embodiment in accordance with the invention.

The functional block diagram in FIG. 1 depicts a typical transmission system in which an echo suppressor in accordance with the invention may be employed; namely, t two-way transmission system including a four-wire transmission channel and a two-wire transmission channel. Subscriber terminal 10, referred to herein as the near-end subscriber, is connected to the four-wire channel by two-wire, two-way circuit 11 and hybrid network or its equivalent 12. Extending from hybrid 12 are a pair of one-way transmission paths 14 and 15 associated respectively with receiver 16 and transmitter 17. The four-wire transmission channel, depicted as a pair of two-wire paths, may comprise a pair of carrier channels, a pair of one-way radio paths, or other one-way transmission channels for interconnecting subscriber terminals. Digital transmission is assumed over the four-wire channel and thus receiver 16 and transmitter 17 function in the usual fashion for converting between analog signals on the two-wire channel and corresponding digital code words on the four-wire channel. Furthermore, as is well known, receiver 16 and transmitter 17 may comprise parallel-to-serial and serial-to-parallel conversion circuitry, if desired for a particular facility, or such conversion circuitry may be included within echo suppressor 20. Similar circuitry 96 and 97 may be included also in incoming receive and outgoing transmit paths 84 and 85, either at the far subscriber end or at echo suppressor 20, as depicted in FIG. 1.

Echo suppressor 20, connected in circuit with the four-wire transmission channel, is commonly referred to as a full echo suppressor since it operates to suppress echos in both directions over the channel. As discussed below, echo suppressor 20 may be enabled or disabled in response to common control signals over path 95. Furthermore, responsive to such common control signals, echo suppressor 20 can be enabled selectively as a split echo suppressor (operating to suppress echos in only one direction over the channel) by effectively removing or inhibiting the functions of detector 55 and attenuator 38. In such case these functions would be provided by another split echo suppressor (not shown) located at the far subscriber end for suppressing echos in the other direction over the transmission channel. In either case, a variety of echo suppressor arrangements for providing full or split echo suppression as depicted in the block diagram of FIG. 1 are well known and described in detail in the art. See, for example, R. E. LaMarche-C. J. May, Jr. U.S. Pat. No. 3,673,355, issued June 27, 1972 and U.S. Pat. No. 3,823,275 issued July 9, 1974. Consequently, the description of these arrangements herein will be limited to that believed necessary for a complete understanding of the present invention. Furthermore, it will be appreciated that echo suppressor 20, though shown connected to a single transmission channel for purposes of describing the invention, may be shared advantageously among a plurality of transmission channels on a time division multiplexed basis, each channel being connected to the echo suppressor during a distinct time slot such as in the manner disclosed in the above LaMarche-May patents.

Echo suppressor 20 comprises detector circuit 25, suppression control circuit 50 and transmit suppression circuit 40 for interrupting or disabling speech transmission over outgoing path 85 when signals from the far end appear on incoming path 84, thereby preventing echos due to incoming signals on path 84 from returning to the far-end subscriber terminal over path 85. Echo suppressor 20 similarly includes detector circuit 55, suppression control circuit 50 and receive suppression circuit 30 for interrupting or disabling speech transmission on incoming path 84 when signals from near-end subscriber 10 appear on outgoing path 85, thereby preventing echos due to signals on path 85 from returning to the near-end subscriber 10 over path 84.

Detector circuits 25 and 55 examine the incoming and outgoing signals to determine when near-end subscriber 10 is transmitting, when the far-end subscriber is transmitting and when both subscribers are transmitting. As discussed in detail below, detector circuits 25 and 55 include respective echo envelope generators 26 and 56 for accurately approximating the echo signals that may appear on one path due to speech signals on the other path. The echo signal approximations are then compared with the actual signals appearing on the one path to determine whether the latter contain speech to be transmitted on the one path. Based on this determination, detector circuits 25 and 55 direct corresponding indications to suppression control circuit 50 which takes appropriate action. If the far-end subscriber is determined to be transmitting and near-end subscriber 10 is not, for example, control circuit 50 disables speech transmission over outgoing path 85 by extending a suppression enabling signal over path 52 to transmit suppression circuit 40.

Responsive to the suppression enabling signal, switch 45 operates to extend to outgoing path 85 the signals appearing on path 75 through attenuator 48. Attenuator 48 and switch 45 effectively disable speech transmission over outgoing path 85, such as by digitally attenuating signals on path 75 to a level below the threshold of hearing. In the absence of suppression, outgoing signals on paths 15 and 75 are extended through switch 45 directly to outgoing path 85.

In a similar manner, in the case of full echo suppressor operation, if near-end subscriber 10 is determined to be transmitting and the far-end subscriber is not, control circuit 50 disables speech transmission over incoming path 84 by extending a suppression enabling signal over path 51 to receive suppression circuit 30. Responsive to the suppression enabling signal on path 51, switch 35 operates to interrupt the direct connection therethrough between paths 84 and 74, instead extending signals on incoming path 84 over path 36 through attenuator 38 to path 74.

It may be noted at this point that the four-wire transmission facility typically contributes significantly to the overall background noise heard by near-end subscriber 10. Thus, if receive suppression circuit 30 simply operates to disable incoming receive path 84 in the same manner a transmit suppression circuit 40 disables path 85, a significant drop will occur in the noise level received by near-end subscriber 10, perhaps sufficient to cause subscriber 10 to believe that the transmission facility has failed or been disconnected. However, as disclosed in C. J. May, Jr.-F. L. Pento U.S. Pat. No. 3,991,287 issued Nov. 9, 1976, audible transmission over path 74 to subscriber 10 need not be totally disabled during operation of suppression circuit 30. Rather, when incoming echo signals on path 84 are suppressed, a noise signal may be extended by suppression circuit 30 over path 74 to subscriber 10 of sufficient magnitude to substantially offset the noise drop, leaving subscriber 10 essentially unaware of the operation of echo suppressor 20.

Receive suppression circuit 30 also includes double-talk attenuator 39, which is used when echo suppressor 20 is enabled as a split echo suppressor. Attentuator 39 helps reduce echos in the situation where both subscribers are talking to one another simultaneously and normal echo suppression cannot be used. While speech transmission over path 85 is disabled to supress echos, near-end subscriber 10 may start transmitting. Simultaneous transmission in both directions is permitted, of course, and is effected by operation of break-in circuitry 53 in suppression control circuit 50. When subscriber 10 starts transmitting, detector circuit 25 indicates to suppression control circuit 50 that both subscribers are transmitting, i.e., that a double-talking situation exists. Break-in circuitry 53 responds by causing the suppression enabling signal to be removed from path 52, thereby reestablishing the direct outgoing signal path through switch 45 from path 75 to path 85. At the same time, control circuit 50 causes a double-talking loss enabling signal to be extended over path 51 to receive suppression circuit 30. Responsive thereto, switch 35 in suppression circuit 30 operates to connect double-talk attenuator 39 in circuit with incoming path 84.

Double-talk attenuator 39 may provide a small fixed loss on the order of 6–10 dB or, advantageously, it may provide a loss which varies with the level of the incoming signal on path 84. See, for example, C. J. May, Jr. U.S. Pat. No. 3,973,086, issued Aug. 3, 1976. Therein, the variable double talking loss is provided by a digital compression circuit which is switched into the incoming path. More particularly, responsive to an enabling signal during double talking, the compression circuit operates to compress the level of the incoming signals in a predetermined manner and to extend the compressed signals to the near-end subscriber.

Should one of the two subscribers cease transmitting, the appropriate detector circuit provides an indication thereof to initiate termination of the break-in state. If subscriber 10 ceases transmitting while the far-end subscriber continues transmitting, detector circuit 25 indicates that situation to control circuit 50. After a hangover time interval, break-in circuitry 53 responds by removing the loss enabling signal from path 51, disconnecting double-talk attenuator 39 from the incoming transmission, path at the same time control circuit 50 extends a suppression enabling signal over path 52 to suppression circuit 40. Responsive to the signal on path 52, switch 45 operates to connect attenuator 48 in the outgoing transmission path for echo suppression.

Break-in circuitry 53 operates in a similar manner when echo suppressor 20 is enabled as a full echo suppressor, except that a loss enabling signal is not extended over path 51 to connect double-talk attenuator 39 in circuit with path 52. Thus, during full echo suppressor operation, when speech transmission over path 74 or 85 is disabled to suppress returning echos of the subscriber currently transmitting, and the other subscriber starts transmitting, break-in circuitry 53 simply causes the suppression enabling signal to be removed from the suppression circuit connected in the other subscriber's transmission path.

In accordance with one aspect of the illustrative embodiment of the invention, break-in circuitry 53 operates in conjunction with wait-window circuitry 54 to better distinguish between impulse noise and speech for break-in. Specifically, the detection of double talking provides substantially instantaneous break-in in the manner described above, which is then followed by a short wait period of sufficient duration (e.g., on the order of 8 msec) to allow typical impulse noise to subside. After the wait period, a short speech sampling window is provided (e.g., on the order of 16 msec) during which the presence or absence of speech signals, on path 75 in the illustrative example described above, is determined in the normal manner. If no speech signals are detected during the window, it is assumed that break-in was due to noise. The break-in state is terminated immediately and echo suppression is enabled as before. Consequently, break-in due to noise is limited to the duration of the short wait-window periods.

On the other hand, if speech signals are detected during the window, echo suppressor 20 goes into what may be referred to as a full break-in state. When echo suppressor 20 goes into the full break-in state, it remains in that state for a predetermined hangover interval of time after double talking ceases, thereby tending to reduce undesirable clipping of the subscriber speech signals.

DETAILED DESCRIPTION

Figure 2:
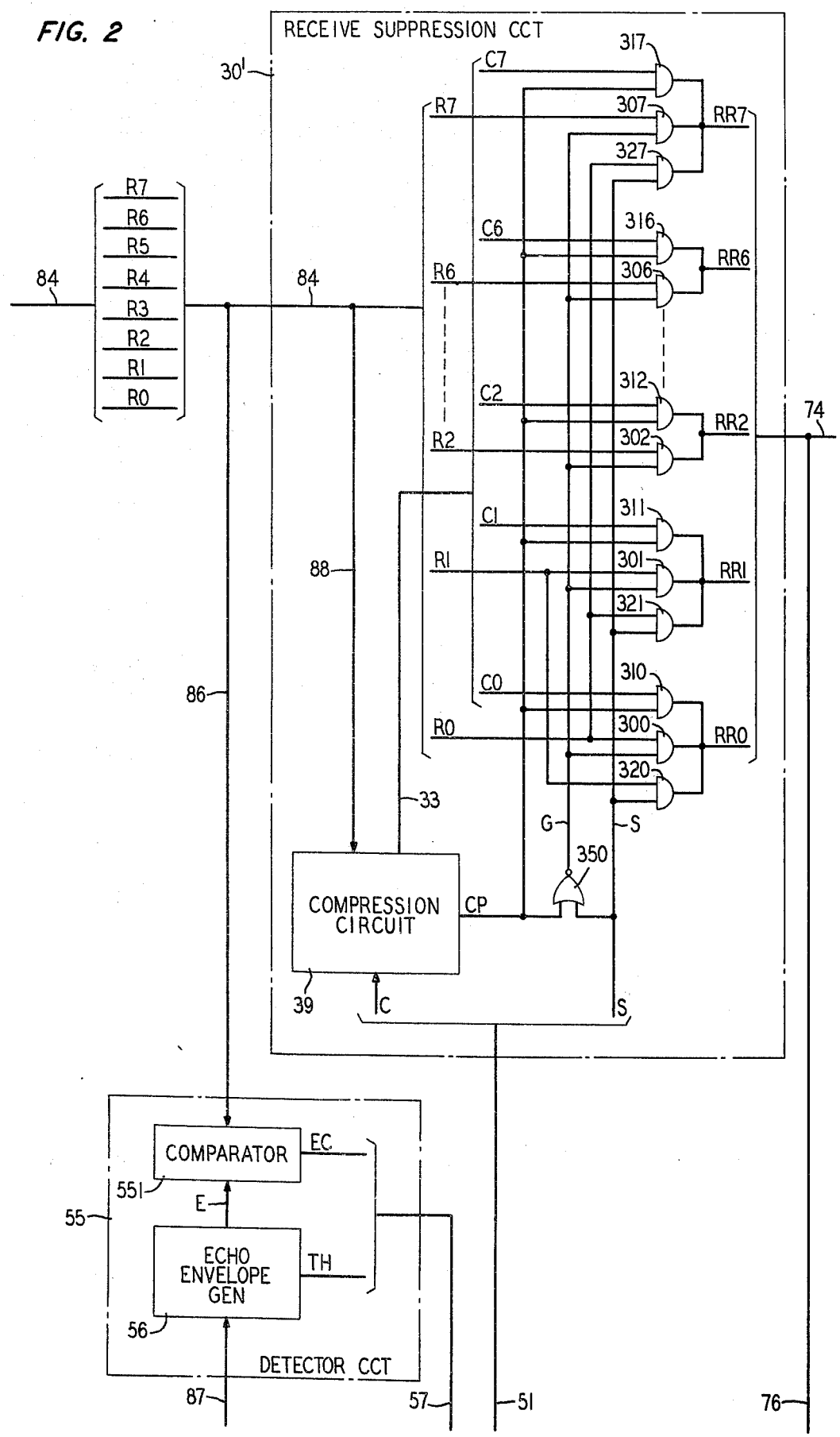
FIGS. 2 and 3, when

An illustrative embodiment of an echo suppressor according to the principles of the invention and operating generally in the manner described above is shown in greater detail in FIGS. 2 and 3. For purposes of describing the illustrative embodiment, digitally encoded speech and echo signals on incoming path 84 are assumed to comprise code words, each illustratively having eight bits R0–R7. One such code is common use in pulse code modulation speech transmission systems is a $\mu = 255$ companded sign magnitude code. Each eight bit companded sign magnitude code word includes a sign bit R7, segment or chord bits R4–R6, and position or linear bits R0–R3. Sign bit R7 thus indicates the polarity of an encoded signal sample and bits R0–R6 indicate the magnitude thereof. Outgoing encoded signals on paths 75 and 85 similarly comprise code words having eight bits, such as bits T0–T7 depicted on path 85.

Incoming code word bits R0–R7 on path 84 are extended to one input of respective bit gates 300–307 in receive suppression circuit 30'. The other input of each of gates 300–307 is connected in common to lead G and thus through NOR gate 350 via lead S over path 51 to control circuit 50. Gates 300–307 are normally enabled over lead G, via gate 350 in the absence of suppression and compression enabling signals on leads S and CP, respectively, to extend code word bits R0–R7 directly therethrough on leads RR0–RR7 to path 74.

To enable suppression of echo signals on path 84 control circuit 50 extends a suppression enabling signal over path 51 and lead S to disable gate 350, thereby disabling gates 300–307 via lead G. Consequently, during suppression the code word bits R0–R7 are no longer extended through gates 300–307 to path 74. However, for providing a noise signal during full echo suppressor operation substantially in the manner described in the above-mentioned C. J. May, Jr.-F. L. Pento patent application, suppression circuit 30' also includes a second plurality of gates 320, 321 and 327. One input of each of gates 320, 321 and 327 is connected in common via lead S over path 51 to control circuit 50. Least significant bit R0 on path 84 is extended to one input of gates 321 and 327 and next-to-least significant bit R1 is extended to one input of gate 320. Gates 320, 321 and 327 are enabled by the suppression enabling signal on lead S, extending bit R0 through gates 321 and 327 and extending R1 through gate 320 over leads RR1, RR7 and RR0, respectively, to path 74. Thus, the sign bit R7 of each incoming echo code word on path 84 is replaced during echo suppression by the least significant bit R0 of the echo code word, the least and next-to-least significant bits R0 and R1 are interchanged, and the remaining bits are effectively zeroed. The thus modified echo code words advantageously provide an unintelligible noise signal on path 74 of appropriate amplitude to offset the typical drop in received noise level during echo suppression.

A third plurality of gates 310–317 and compression circuit 39 are included in receive suppression circuit 30' for use in providing echo suppression during double talking when echo suppressor 20 is enabled for split echo suppressor operation. Incoming code words on path 84 are extended over path 88 to compression circuit 39 which, responsive to a double-talking loss enabling signal on lead C over path 51 from control circuit 50, provides corresponding eight-bit compressed code words over path 33 to gates 310–317. In particular, bits C0–C7 of the compressed code words are connected to one input of respective gates 310–317, the other input of each of which is connected in common to lead CP. Gates 310–317 are enabled during double talking, by a signal on lead CP from compression circuit 39, to extend the compressed code words bits C0–C7 therethrough on leads RR0–RR7 to path 74. The compressed code word bits may be generated by compression circuit 39, for example, in substantially the manner disclosed in the above-mentioned C. J. May, Jr. patent application, effectively providing different incoming signal loss for different incoming signal levels during double talking.

Transmit suppression circuit 40' may similarly include a plurality of bit gates 400–407 (not shown) to provide the broad functions of switch 45 and attenuator 48. The bit gates are normally enabled to extend outgoing code word bits T0–T7 therethrough from path 75 to path 85. When echo suppression is desired in the outgoing path, a suppression enabling signal over path 52 from control circuit 50, disables the bit gates in suppression circuit 40, effectively zeroing bits T0–T7 on path 85.

As mentioned above, the function of detector circuits 25 and 55 is to examine the incoming and outgoing signals to determine when one or the other or both subscribers are transmitting. In particular, when echo suppressor 20 is used as a full echo suppressor, detector circuit 55 determines when near-end subscriber 10 is transmitting and whether the incoming signals on path 84 contain far-end subscriber speech. An illustrative embodiment of detector circuit 55 is shown in block diagram in FIG. 2 and in greater detail in FIG. 4. Detector circuit 25, though not shown in detail, may include substantially identical circuitry for determining when the far-end subscriber is transmitting and for determining whether the outgoing signals on path 75 contain near-end subscriber speech.

Detector circuit 55 includes echo envelope generator 56 and comparator 551. Outgoing signals on path 85 are extended via path 87 to echo envelope generator 56. If the outgoing signals (or approximations thereof reflecting echo end delay) exceed a predetermined threshold, a signal is provided on lead TH over path 57 to control circuit 50, indicating that subscriber 10 is transmitting. The predetermined threshold may correspond, for example, to the minimum outgoing signal level on path 85 for which echo suppression is needed or desired on incoming path 84. Of course, the threshold may be zero, if desired, such that suppression is always enabled in a particular subscriber transmission path except when that subscriber is transmitting.

Generator 56 functions to generate approximations of the echo signals that may appear on path 84 due to the outgoing signals on path 85. The echo signal approximations are then extended over path E and are compared, via comparator 551, with the actual incoming signals extended over path 86. Based on the comparison, a signal is directed over lead EC and path 57 to control circuit 50, indicating whether the incoming signals on path 84 contain far-end subscriber speech.

Figure 4:
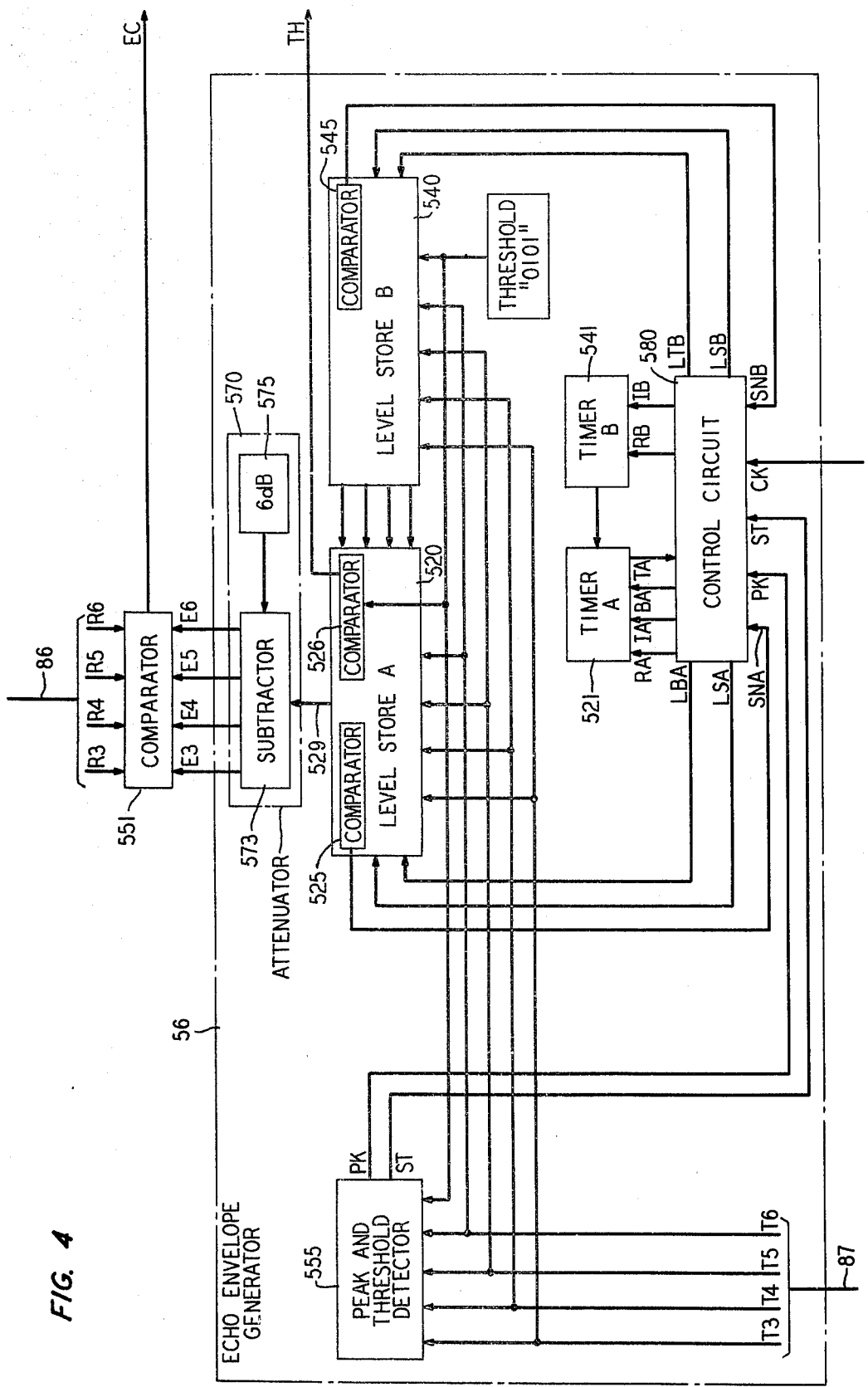
FIG. 4 is a detailed block diagram of an illustrative detector circuit which may be employed in FIGS. 1-3.

In the illustrative embodiment of echo envelope generator 56 shown in FIG. 4, only the four most-significant magnitude outgoing bits T3–T6 are used for determining whether subscriber 10 is transmitting and, also, for generating four-bit echo signal approximations thereof on leads E3–E6 to compare with the incoming four most-significant magnitude bits R3–R6 appearing on path 86. It will be appreciated that a greater or fewer number of magnitude bits may be employed if desired for a particular system. Generator 56 comprises digital peak and threshold detector 555, a pair of four-bit level stores 520 and 540, a corresponding pair of timers 521 and 541, digital attenuator 570 and control circuit 580. Bits T3–T6 of each successive outgoing encoded signal, directed over path 87 and registered in turn in detector 555, are compared with a fixed encoded threshold, illustratively 0101; and if the threshold is exceeded, an indication thereof is provided by detector 555 over lead ST to control circuit 580. The present outgoing signal bits T3–T6 are also compared in detector 555 with the corresponding bits of the immediately preceding outgoing signal. If the comparison determines that the present outgoing signal magnitude is the same as or greater than the previous outgoing signal magnitude, an indication thereof is provided on lead PK to control circuit 580.

The operation of generator 56 in generating echo signal approximations on leads E3–E6 is basically to follow and hold peak magnitudes of the signal on outgoing path 85 while the signal is increasing and, while the signal is decreasing, to follow successively lower signal peak magnitudes separated approximately by a predetermined interval of time. Signal peaks are defined herein as the magnitude of a present outgoing encoded signal being equal to or greater than the magnitude of the preceding encoded signal, as indicated by detector 555 over lead PK. The predetermined interval of time is selected in accordance with the anticipated echo end delay for the particular transmission facility. For example, the maximum end delay for a signal on path 74 to reach path 75 via hybrid 12 at the near subscriber end may be on the order of 25 msec. Similarly, the maximum end delay for a signal on path 85 to reach path 84 via the far subscriber end may be on the order of 75 msec. The echo signal approximations on leads E3–E6, through attenuator 570, are also attenuated in magnitude to reflect the anticipated echo signal return loss, which may be on the order of 6 dB. The anticipated end delay and return loss parameters employed for generating echo signal approximations may have fixed values, as in the illustrative embodiment herein, or the values may be varied adaptively in accordance with various parameters of the particular transmission facility.

Figures 5, 6:
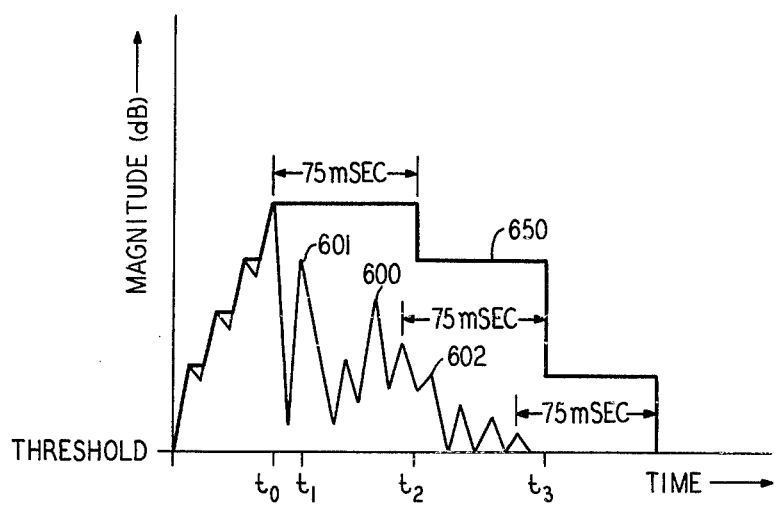
FIG. 5 is a table showing various combinations of control circuit input signals that may occur in the detector circuit of FIG. 4 and the corresponding output signals produced thereby.
FIG. 6 depicts illustrative waveforms useful in describing the operation of the detector circuit in FIG. 4.

During the following description of the operation of generator 56, reference may be made to the table in FIG. 5, and to the illustrative waveforms depicted in FIG. 6. The table in FIG. 5 shows various combinations of control circuit 580 input signals that may occur and the corresponding output signals provided by control circuit 580 in response thereto. A logical 1 input represents the presence of the condition indicated over the particular lead, logical 0 represents the absence of the condition, and shading indicates a "don't care" situation for the particular input lead. Thus, for example, a logical 1 on input lead ST indicates that the present code word magnitude on path 87 exceeds the threshold, while a logical 1 on input lead PK indicates that the present code word magnitude on path 87 is a signal peak as defined herein. Similarly, a logical 1 output represents the action enabled over the particular output lead in response to the input signal combinations indicated. Thus, a logical 1 on output lead LSA enables loading of the present code word magnitude on path 87 into store 520, while a logical 1 on output lead LTB sets store 540 to the threshold magnitude.

The waveform 600 in FIG. 6 depicts, for purposes of illustrating the operation of generator 56, an analog signal magnitude envelope represented by a succession of digitally encoded outgoing signals extended over path 87. Waveform 650 depicts the corresponding echo signal magnitude envelope generated in digitally encoded form on path 529 in response to waveform 600. The encoded echo signals extended to comparator 551 through attenuator 570 correspond to waveform 650 attenuated by the anticipated echo signal return loss.

More particularly, as successive digital code words are extended over path 87, the basic operation of generator 56 in FIG. 4 is to store the magnitude of the highest signal peak in level store 520 and the magnitude of the next-to-highest signal peak in level store 540, under control of load signals on leads LSA and LSB, respectively, from control circuit 580. Until the highest signal peak is found, the threshold magnitude is stored in store 540. Signal peaks, it will be recalled, are indicated oer lead PK to control circit 580. Thus, stores 520 and 540 include respective comparators 525 and 545 for comparing each successive encoded signal on path 87 with the peak magnitude signals stored in the respective stores. If the comparison determines that the present outgoing signal magnitude exceeds the stored magnitude in either store, a greater than indication (1) is provided to control circuit 580 over respective leads SNA and SNB. Store 520 also includes a second comparator 526 for comparing the peak magnitude stored therein with the threshold magnitude; and if the threshold is exceeded a signal is provided on lead TH oer path 57 to suppression control circuit 50', indicating that subscriber 10 is transmitting.

Responsive to the greater than indication from store 520 over lead SNA, control circuit 580 provides the following output signals, as shown in FIG. 5: a signal on lead LSA to load the present outgoing peak magnitude on path 87 into store 520, a signal over lead LSB to load threshold magnitude 0101 into store 540, and signals on leads RA and RB to reset timers 521 and 541. For increasing magnitude outgoing signals, therefore, store 520 follows the increasing signal peaks until the highest peak is found, as may be seen in FIG. 6, and store 540 contains the threshold magnitude.

On the other hand, once the highest peak is found and stored in store 520, at time $t_0$ in FIG. 6, the greater than indication will no longer appear on lead SNA. Thus, the output signals provided by control circuit 580 will depend upon combinations of the signals on leads SNB, ST, PK and TA as may be seen in FIG. 5. If, referring to the second column of FIG. 5, for example, the present outgoing signal magnitude is increasing (as indicated over lead PK) and exceeds the magnitude in store 540 (as indicated over lead SNB), and timer 521 has not timed out over lead TA in the manner described below, control circuit 580 responds with an output signal on lead LSB to load the present outgoing peak magnitude in store 540, a signal on lead RB to reset timer 541, and a signal on lead IA to increment timer 521. Thus, at time $t_1$ in FIG. 6, the next-to-highest signal peak magnitude 601 would be loaded in store 540.

Each time an outgoing peak magnitude exceeding the magnitude in store 520 appears on path 87 and is stored in store 520 in the manner described above, timer 521 is reset to zero via lead RA. Timer 541, on the other hand, is normally reset to zero via lead RB each time an outgoing signal magnitude appears on path 87, except for the control circuit input signal combinations shown in the last two columns of FIG. 5. Both timers 521 and 541 are incremented by control circuit 580 over respective leads IA and IB, as indicated in FIG. 5, at a fixed rate determined by clock signals on lead CK from suppression control circuit 50 or from common control circuitry.

Timer 521, upon being reset and subsequently incremented, times for the above-mentioned predetermined interval of time corresponding to the echo end delay for the transmission facility, for example 75 msec in the case of detector 55. Unless it is reset again before the predetermined interval elapses, timer 521 provides a timeout signal on lead TA to control circuit 580 at the end of the interval. Responsive to the timeout signal on lead TA, control circuit 580 enables the loading into store 520 of the greater of two signal magnitudes —the magnitude in store 540, via a load signal on lead LBA, or the present peak magnitude on path 87 via a load signal on lead LSA. For example, when timer 521 times out at time $t_2$ in FIG. 6, the magnitude of peak 601 previously stored in store 540 is transferred to store 520. Subsequently, the magnitude of peak 602 is loaded into store 540 in the manner described above and, at time $t_3$ in FIG. 6, is transferred from store 540 to store 520. Thus, for decreasing magnitude outgoing signals, store 520 follows successively lower signal peak magnitudes separated approximately by a predetermined interval of time corresponding to the anticipated echo end delay.

Each time timer 521 times out and the contents of store 540 are transferred to store 520, the threshold magnitude is loaded into store 540 unless the present peak magnitude on path 87 exceeds the threshold but is less than the magnitude being transferred to store 520. In the latter case, the present peak magnitude on path 87 is loaded into store 540.

In any event, the timing count in timer 541 is transferred to timer 521 via a signal over lead BA, and timer 541 is reset via lead RB. Timer 521 then continues to timeout for the remainder of the predetermined interval of time or until reset. The above-described operation continues, essentially following increasing signals on path 87 and storing the highest peak magnitude in store 520 and starting timer 521 each time a higher peak is found, storing the next-to-highest peak magnitude occurring during the timing interval in store 540 and transferring the latter to store 520 each time timer 521 times out, until there are no more peak magnitudes appearing on path 87.

The encoded peak magnitude in store 520 is extended over path 529 to digital attenuator 570, illustratively comprising subtractor 573 and magnitude circuit 575. As mentioned above, attenuator 570 operates to attenuate the encoded magnitude appearing on path 529 by an amount determined according to the anticipated echo signal return loss, e.g., on the order of 6 dB. Thus, the encoded magnitude corresponding to such loss (illustratively 0010) is provided to subtractor 573 by circuit 575 and is subtracted from the signal appearing on path 529. The attenuated signals thus provided by subtractor 573 on leads E3–E6 comprise encoded echo signal approximations corresponding to the outgoing signals on path 87.

As mentioned above, the actual incoming signals on path 84 extended over path 86 are compared, via comparator 551, with the echo signal approximations on leads E3–E6. If the comparison determines that the far-end subscriber is not transmitting, i.e., that the signals on path 84 represent echo due to near-end subscriber speech, an echo indication is provided over lead EC on path 57 to suppression control circuit 50'. In accordance with the signals over leads TH and EC on path 57 from detector circuit 55, and similarly provided signals on path 27 from detector circuit 25, control circuit 50' takes appropriate action with regard to the insertion or removal of echo suppression and double-talking loss in the respective transmission paths in the manner described above.

Figure 3:
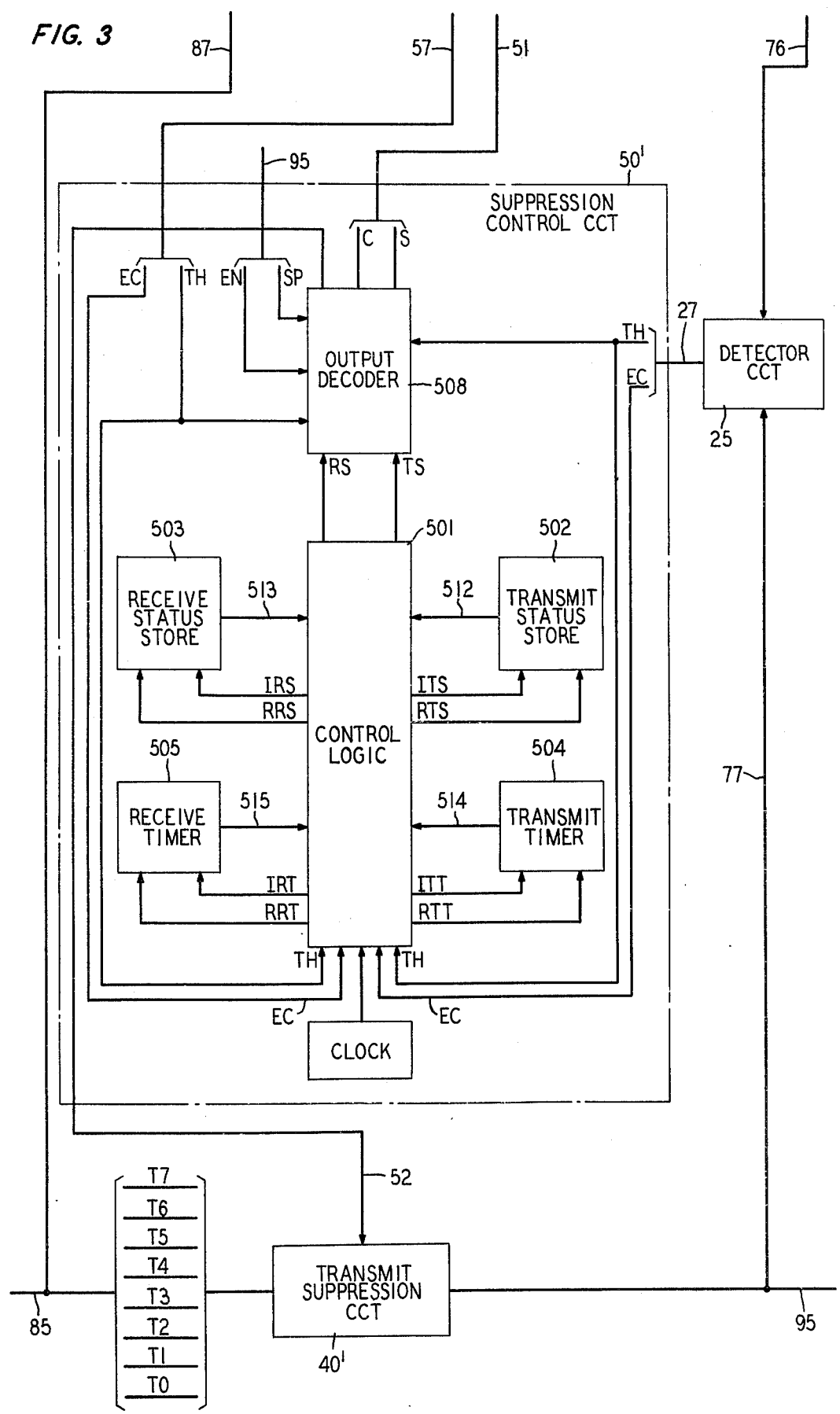

Control circuit 50', as shown illustratively in FIG. 3, comprises control logic 501 to which the echo and threshold signal indications on leads EC and TH are directed, and output decoder 508 to which the threshold signal indications on leads TH are directed. Output decoder 508 also receives transmission path status signals over leads TS and RS, indicating the current idle or break-in status of the respective outgoing transmit and incoming receive paths, and common control signals over leads EN and SP, for enabling echo suppressor operation and for determining whether the echo suppressor is to provide full or split echo suppression for the particular pair of transmission paths. Responsive thereto, decoder 508 extends the appropriate suppression and double-talking loss enabling signals over paths 51 and 52 to suppression circuits 30' and 40'.

Suppression control circuit 50' also includes transmit status store 502, receive status store 503, and associated transmit and receive timers 504 and 505. Status stores 502 and 503 each comprise a two-bit memory per transmission path for keeping track of the status of the respective transmit and receive paths. Timers 504 and 505 each comprise a timing counter per transmission path for keeping track of predetermined timing intervals associated with the various transmission path states. The individual transmit and receive status store memories and timing counters are assumed to be connected to control logic 501 in conventional manner on a time division multiplexed basis during the same time slot as the transmission channel associated therewith is connected to echo suppressor 20.

Figure 7:
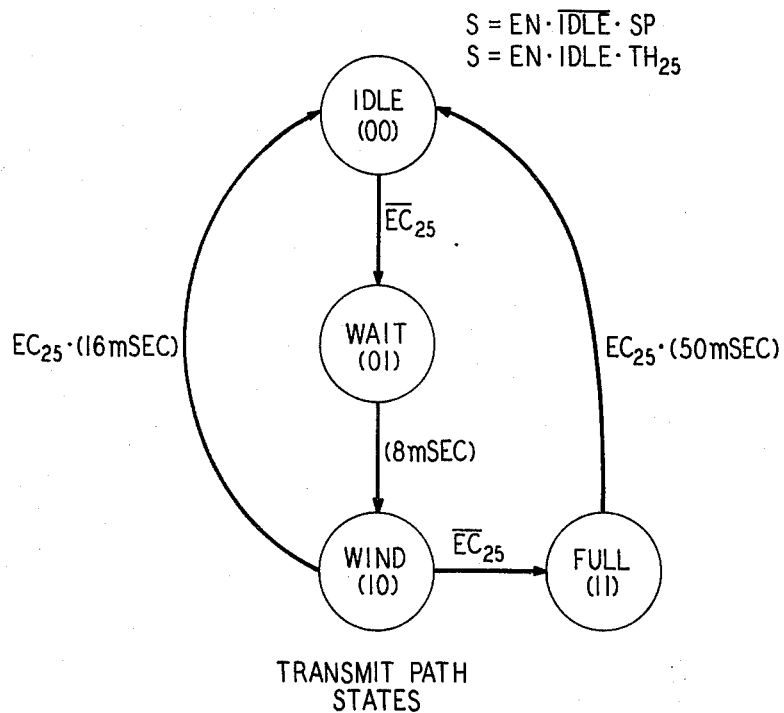
FIGS. 7 and 8 are state diagrams useful in describing the operation of the echo suppressor shown in FIGS. 1-3.
Figure 8:
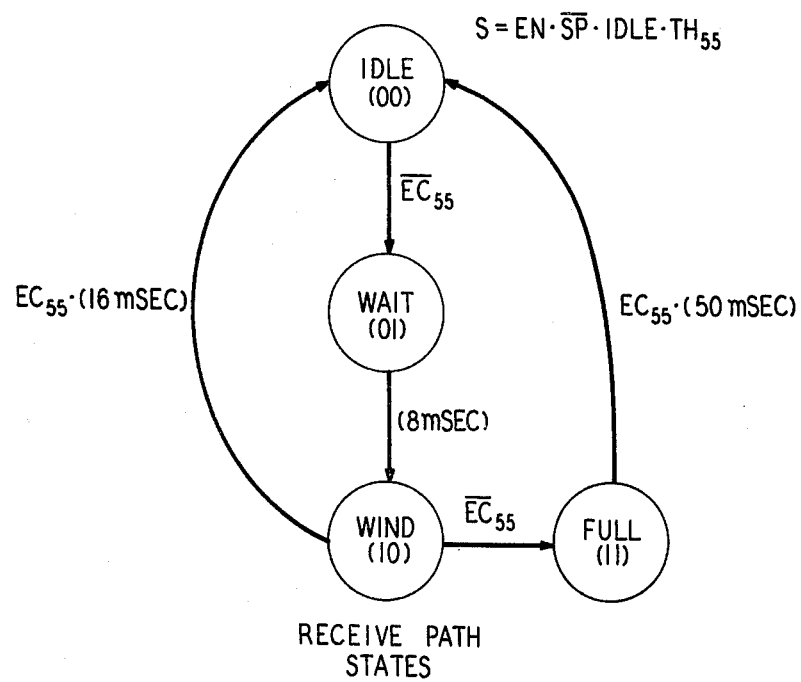

The incoming and outgoing path state diagrams shown in FIGS. 7 and 8 depict the four possible states in which the respective transmission paths may reside. These states are referred to therein as IDLE, WAIT, WIND and FULL, and may be represented in the status stores as respective status codes 00, 01, 10 and 11. The various status codes contained in stores 502 and 503 are changed, via respective increment leads ITS and IRS and respective reset leads RTS and RRS, in response to changes in the signals on the outgoing and incoming paths as indicated by detectors 25 and 55 over leads EC. An indication of the particular outgoing and incoming path status is extended to control logic 501 over respective paths 512 and 513 from stores 502 and 503. Timers 504 and 505 are similarly incremented at a fixed rate determined by appropriate clock signals over respective leads ITT and IRT and reset over respective leads RTT and RRT, providing an indication of current timing counts therein to control logic 501 over paths 514 and 515.

The IDLE state (00) may be thought of as the non-break-in state for a transmission path and the other three states may be thought of as break-in states. When a particular transmission path is in the IDLE state, echo suppression is enabled in that path if the signal on lead TH from the detector circuit associated with the path indicates the presence of signals on the other path exceeding the threshold. Thus, as indicated in FIG. 7, a suppression enabling signal S is provided over path 52 to transmit suppression circuit 40' if the transmit path state is IDLE, and an enabling signal is present on lead EN, and a threshold indication appears on lead TH from detector circuit 25. Similarly, as indicated in FIG. 8, a suppression enabling signal is provided over path 51 to receive suppression circuit 30' if similar conditions prevail and if, further, no enabling signal appears on lead SP (i.e., if full echo suppressor operation is being provided). Double-talking loss, it will be recalled, is never applied except in the case of split echo suppressor operation when the transmit path is in a break-in state. As indicated in FIG. 7, when split echo suppressor operation is enabled and the transmit path is in one of the three break-in states (i.e., is not IDLE), a signal is provided on lead C to receive suppression circuit 30', inserting double-talking loss in the manner described.

The WAIT and WIND states function to permit the echo suppressor to better distinguish between impulse noise and speech for break-in. Specifically, break-in is effected substantially instantaneously upon detection of double-talking as described above, and the corresponding status store 502 or 503 is placed in the WAIT state. For example, if subscriber 10 is transmitting and double-talking is detected on incoming path 84, i.e., threshold and speech (non-echo) indications appear on leads TH and EC from detector 55, receive status store 503 is incremented to the WAIT state (01), as shown in FIG. 8. The symbol $\overline{EC}_{55}$ in FIG. 8 refers to the absence of a signal on lead EC from detector 55, indicating that the incoming signals on path 84 exceed the echo approximations and thus include far-end subscriber speech. This initiates an 8 msec WAIT period, determined by the incrementing of receive timer 505, to allow typical impulse noise to subside. After the WAIT period, status store 503 is incremented to the WIND state (10) to initiate a 16 msec speech sampling window, again determined by timer 505. If break-in was caused by noise, the noise will have subsided during the WAIT period, and no far-end subscriber speech will be detected on incoming path 84 during the sampling window; i.e., the echo indication will reappear on lead EC from detector 55. Consequently, as shown in FIG. 8, receive status store 503 is immediately reset to the IDLE state, terminating break-in, and echo suppression is reinserted as before via suppression circuit 30'. If, on the other hand, far-end subscriber speech is detected on path 84 during the sampling window, receive status store 503 is incremented to the FULL state (11).

Status store 503 remains in the FULL state until a predetermined interval of time after double-talking has ceased, referred to as break-in hangover. The break-in hangover time for the illustrative echo suppressor herein may be on the order of 50 msec, as depicted in FIG. 8, and is determined by the incrementing of timer 505. Consequently, when the receive path is in the FULL state, if an echo indication appears on lead EC from detector 55 and persists for 50 msec, as indicated by timer 505, status store 503 is returned to the IDLE state (00). Assuming subscriber 10 is still transmitting at this point, echo suppression is reinserted in the receive path in the normal manner. On the other hand, if the echo indication on lead EC does not persist for 50 msec, timer 505 is reset and the full break-in state continues.

Transmit status store 502 and transmit timer 504 operate in a substantially identical manner for keeping track of the status and timing intervals for outgoing transmit path 85, as shown in FIG. 7. Of course, it will be appreciated that when echo suppressor 20 is enabled as a split echo suppressor for a particular transmission channel, only transmit store 502 and transmit timer 504 are needed; the status of incoming path 84 is a don't care condition. Thus, for split echo suppressor operation, output decoder 508 is responsive only to the status signals over lead TS and not to such signals over lead RS.

What has been described hereinabove is a specific illustrative embodiment of the principles of the present invention. For example, it will be appreciated that although in the illustrative embodiment only a pair of stores and timers are employed for generating echo approximations, additional stores and timers can be used to achieve greater accuracy during the falling portions of speech signals. The additional stores and timers would function in connection with successively lower magnitude signal peaks in substantially the same manner as store 540 and timer 541 function in connection with the next-to-highest signal peaks. Numerous and varied other arrangements may be derived by those skilled in the art without departing from the spirit and scope of the invention.

What is claimed is:

1. In an arrangement for suppressing echos in a two-way communications system having first and second paths, means responsive to signals on said first path for inserting a suppression loss in said second path, and break-in means responsive to predetermined signals on said second path for removing said suppression loss, said break-in means including a detector circuit comprising, first means for providing a first representation which follows rising peak magnitudes of said first path signals, second means including said first means for providing a second representation which follows decreasing peak magnitudes separated approximately by a predetermined interval of time, and means for using said first and second representations, less a predetermined loss, to generate a signal approximating the anticipated second path echo for said first path signals.

2. The arrangement of claim 1 wherein said first means comprises storing means for holding said first representation for said predetermined interval of time during decreasing magnitudes of said first path signals.

3. The arrangement of claim 2 wherein said second means includes first timing means for defining said predetermined interval of time.

4. The arrangement of claim 1 wherein said using means comprises an output path connected to said first means, and attenuator means connected to said output path for providing said predetermined loss.

5. The arrangement of claim 4 wherein said predetermined loss is determined according to the loss anticipated for said first path signals in returning as echos on said second path.

6. The arrangement of claim 5 wherein said predetermined interval of time is determined according to the delay anticipated for said first path signals in returning as echos on said second path.

7. The arrangement of claim 6 further comprising means for comparing signals on said output path with said second path signals.

8. An echo envelope generator comprising means for detecting peak magnitudes of input signals, first storing means for following increasing magnitude input signals and for storing the highest peak magnitude detected, first timing means responsive to the storing of a peak magnitude in said first storing means for initiating a predetermined timing interval, second timing means including a timer and means responsive to the detection of each input signal peak magnitude for restarting said timer, second storing means for storing the magnitude of the next-to-highest peak occurring after the peak magnitude stored in said first storing means, control circuit means responsive to the termination of said predetermined interval of time for transferring said next-to-highest peak magnitude from said second storing means and for storing it in said first storing means, said control circuit means being operative upon the storing of a peak magnitude from said second storing means in said first storing means for reducing said predetermined timing interval in accordance with the state of said timer, and output means connected to said first storing means for using said peak magnitude stored therein less a predetermined loss to generate an echo envelope corresponding to said input signals.

9. A generator according to claim 8 wherein said predetermined loss is determined according to an anticipated echo loss.

10. A generator according to claim 8 wherein said predetermined timing interval is determined according to an anticipated echo delay.

11. In an arrangement for suppressing echos in a two-way communications system having first and second paths, means normally operative in response to signals on said first path for inserting a suppression loss in said second path, break-in means operative in response to predetermined signals on said second path for removing said suppression loss, means responsive to operation of said break-in means for defining a first timing interval followed by a second timing interval, and hangover means operative in response to said predetermined signals on said second path during said second interval, operation of said hangover means preventing insertion of said suppression loss in said second path for a fixed interval of time after cessation of said predetermined signals on said second path.

12. The arrangement of claim 11 further comprising means responsive to said first path signals for generating a signal representation of the echo anticipated therefrom on said second path, and means for comparing said echo signal representation with signals on said second path to detect said predetermined signals.

13. The arrangement of claim 12 wherein said generating means comprises means for following increasing magnitude signals on said first path and, during decreasing magnitude signals on said first path, for following decreasing signal peaks separated approximately by a predetermined interval of time.

14. The arrangement of claim 13 wherein said predetermined interval of time is determined according to the delay anticipated for said first path signals in returning as echos on said second path, and wherein said generating means further comprises means for providing a signal loss corresponding to the loss anticipated for said first path signals in returning as echos on said second path.

15. The arrangement of claim 11 wherein said first timing interval is of sufficient duration to permit anticipated impulse noise on said second path to subside, and wherein said second timing interval is of greater duration than said first timing interval.

16. The arrangement of claim 15 wherein said hangover means includes means responsive to the operation thereof for inhibiting the operation of said suppression loss inserting means for said fixed interval of time after cessation of said predetermined signals on said second path.

17. An echo suppressor arrangement for connection in a two-way communications system having first and second paths comprising; means normally operative in response to speech signals on one of said first and second paths for inserting an echo suppression loss in the other of said first and second paths; means for generating a representation of echo anticipated on said other path caused by said speech signals on said one path, said echo generating means including means for generating a first representation which follows increasing magnitude speech signals on said one path and which, during decreasing magnitude speech signals on said one path, follows decreasing signal peaks separated approximately by a predetermined interval of time, and means for reducing the magnitude of said first representation according to a predetermined loss; means for detecting double-talking speech signals on said other path by comparing signals on said other path with said echo representation; and break-in means operative in response to detection of said double-talking speech signals for removing said suppression loss from said other path.

18. An echo suppression arrangement according to claim 17 further comprising means operative for inhibiting the normal operation of said suppression loss inserting means for a fixed interval of time after cessation of double-talking speech signals on said other path.

19. An echo suppressor arrangement according to claim 18 further comprises means responsive to operation of said break-in means for defining a first timing interval followed by a second timing interval, and means responsive to detection of double-talking speech signals on said other path during said second timing interval for operating said inhibiting means.

* * * * *

UNITED STATES PATENT AND TRADEMARK OFFICE
CERTIFICATE OF CORRECTION

PATENT NO. : 4,029,912
DATED : June 14, 1977
INVENTOR(S) : Alfred A. Geigel and Robert E. LaMarche It is certified that error appears in the above-identified patent and that said Letters Patent are hereby corrected as shown below:

Column 3, line 51, "t" should read --a--. Column 5, line 33, "a" should read --as--. Column 7, line 12, "is" should read --in--. Column 7, line 51, after "extending" add --bit--. Column 10, line 25, "oer" should read --over--. Column 10, line 36, "oer" should read --over--.

Signed and Sealed this

Fourteenth Day of February 1978

[SEAL]

Attest:

RUTH C. MASON
Attesting Officer

LUTRELLE F. PARKER
Acting Commissioner of Patents and Trademarks